United States Patent [19]

Eicher

[11] 4,160,267
[45] Jul. 3, 1979

[54] SWITCHING METHOD FOR MEASURING TWO NEIGHBORING FLYING TARGETS OR OBJECTS IN SUCCESSION

[75] Inventor: Walter Eicher, Gockhausen, Switzerland

[73] Assignee: Contraves AG, Zürich, Switzerland

[21] Appl. No.: 903,668

[22] Filed: May 8, 1978

[30] Foreign Application Priority Data

May 26, 1977 [CH] Switzerland .................. 6487/77

[51] Int. Cl.² .............................................. H04M 7/18
[52] U.S. Cl. .............................. 358/126; 250/203 CT
[58] Field of Search ................... 358/125, 126, 107; 250/203 A, 203 CT

[56] References Cited

U.S. PATENT DOCUMENTS

| 3,646,263 | 2/1972 | Hall | 358/125 |
| 3,736,376 | 5/1973 | Kato, Jr. | 358/126 |
| 4,123,017 | 10/1978 | Lewis et al. | 358/126 |

FOREIGN PATENT DOCUMENTS 2272555  5/1975  France ................................... 358/125

Primary Examiner—Robert L. Griffin
Assistant Examiner—Edward L. Coles

Attorney, Agent, or Firm—Werner W. Kleeman

[57] ABSTRACT

A switching method for measuring or tracking two neighboring flying targets in succession by means of a measuring installation having a television system. A regulation system receives course signals, which correspond to the deviation of the image of a flying target or object from the image center, and aligns the line of sight of the television camera at the flying target. An electronic window limits the formation of the deviation signals to the contribution of the image point of the flying target located in the window. During measurement of the first flying target by means of first deviation signals and a first window there is produced about the image center a second window and second deviation signals which are delimited by the second window. The first deviation signals are added, by actuating a control handle or stick to additional signals, in order to shift the line of sight and thus bring the image of the second flying target into the image center. Thereafter the regulation system is switched into operative relationship with a control by the second deviation signals.

The invention is used to eliminate the effects of alignment errors and transient phenomena upon switching the measurement from one flying target to another flying target.

6 Claims, 2 Drawing Figures

SWITCHING METHOD FOR MEASURING TWO NEIGHBORING FLYING TARGETS OR OBJECTS IN SUCCESSION

BACKGROUND OF THE INVENTION

The present invention relates to a new and improved switching method for measuring or tracking two neighboring flying targets or objects—hereinafter simply referred to as flying targets—in succession by means of a measuring installation.

The measuring or tracking installation is of the type comprising an electronic observation system having an image sensor and an image device, a regulation system for automatically aligning the image sensor at a flying target to be measured and at least one first image evaluation system. At the image evaluation system there are produced from signals of the observation system a first pair of first deviation signals, respectively constituting a measure of the momentary angular deviation in azimuth and elevation between the direction of a first flying target and the sighting line or line of sight of the image sensor. These signals are delivered to the regulation system in the form of a suitable actual value. There is produced in the observation system an electronic window. At the image device there is framed the trace of the sighting line and there is limited processing of the signals of the observation system in the image evaluation system to such signals which correspond to an image point situated at the image device within the window.

Measuring systems or installations of the aforementioned type are known to the art, for instance, as disclosed in German patent No. 25 02 245. Equally, observation systems of the aforementioned type are also known, for instance, from German patent publication No. 24 41 640. Electronic windows are essentially employed as means for improving the video contrast analysis of the image of a flying target. As for instance has been taught in U.S. Pat. No. 3,736,376, such type installations are designed such that the electronic window and the image of the flying target to be measured are brought approximately to the center of the image at the image device and retained at that location. Equally known are manually actuatable control means. These usually comprise a two-dimensionally movable control knob or stick which, according for instance to the construction disclosed in German patent No. 22 09 073, is capable of placing an electronic window at other image points than at the image center. If the operator sights a flying target to be tracked or measured at the image device, then he or she positions the electronic window with the aid of the control means about the image of the flying target, whereafter there is turned-on an automatic aligning device. Now the image sensor is automatically aligned such that the image of the flying target and the electronic window at the image screen revert towards the image center. The position of the image sensor is continuously measured, as is also the exact position of the image of the flying target at the image device. From such measurements there are derived data concerning the position of the flying target in azimuth and elevation. For military purposes such data is used, for instance, for aiming or aligning anti-aircraft weapons into firing position with respect to the flying target. For civilian purposes there is, for instance, continuously photographed the flying target, and the data concerning the position of the flying target is recorded in a coded form at the film. A typical example of such civilian field of application is the measurement or tracking of rockets, used for instance to launch space capsules and the like. Both, during the design of such rockets and also during starting of such space capsules or the like, it is necessary to be able to exactly determine the position, velocity and acceleration of the flying target. It is exactly in such situation that it is, however, necessary to be able to selectively track, as the point to be measured, the nozzle or the cone of the rocket or to be able to track such according to a random point. Switching of the measuring installation from a mode where there is accomplished measurement of one point into an operational mode where the system measures another point (wherein both points can be, for instance, considered to constitute two neighboring flying objects flying in formation) is associated with alignment errors. These alignment errors are predominantly attributable to time-delays associated with the manipulations carried out by the operator. Even doubling the image evaluation system would not constitute any acceptable solution of the switching problem, because during switching of the regulation system from the one deviation signals to the other deviation signals there are generated build-up or transient phenomena which, in turn, cause measurement errors.

SUMMARY OF THE INVENTION

Hence, with the foregoing in mind it is a primary object of the present invention to provide a new and improved switching method for measuring two neighboring flying targets or the like in succession in a manner not associated with the aforementioned drawbacks and limitations of the prior art techniques.

Another and more specific object aims at providing a method of switching the measurement or tracking from one flying target to another neighboring flying target in a manner eliminating errors predicated upon manual operations or manipulations of an operator and upon build-up or transient processes.

Still a further significant object of the present invention is to provide a new and improved method of measuring flying targets, and specifically, eliminating measurement errors during the switching of the measurement or tracking from one flying target to another neighboring flying target, so as to provide for greater accuracy in the target measuring or tracking operations.

Now in order to implement these and still further objects of the invention, which will become more readily apparent as the description proceeds, the inventive method is manifested by the features that there is produced in the observation system, during the automatic alignment of the image sensor at the first flying target, a second electronic window by means of the first image evaluation system. This second electronic window is positioned as a frame to embrace the image of the second flying target at the image device by means of manually operable control means. At a second image evaluation system there is produced a second pair of second deviation signals formed from signals of the observation system corresponding to an image point located at the image device within the second window. As to these last-mentioned pair of signals such respectively constitute a measure of the momentary angular deviation in azimuth and elevation between the direction of the second flying target and the sighting line. Moreover, after completion of positioning of the second window at the image of the second flying target the actual value of the regulation system is switched from the first pair of deviation signals to the second pair of deviation signals. In this way there is effectively avoided that between the measurement of the first flying target and the measurement of the second flying target there will be a time gap, namely, during the entire time that the operator otherwise would need in order to shift the window from the first flying target to the second flying target and to turn-off and again turn-on the automatic alignment device.

The inventive method is preferably improved in that for positioning the second window at the image of the second flying target a respective azimuth auxiliary or additional signal and elevation auxiliary or additional signal is added in each case to an associated first deviation signal and at the same time at the image device the first electronic window is shifted through a deviation or position from the image center which corresponds to the azimuth additional signal and elevation additional signal, respectively, whereas the second electronic window remains at the image center. The azimuth and elevation additional signals are changed, starting from the value null, until, due to reaction of the servo system to such change, the relevant associated second deviation signal is approximately annihilated. The duration of such changing operation is considerably greater than the time-constant of the regulation system. With this preferred embodiment of switching method there is achieved the beneficial result that the line of sight of the image center is already aligned at the second flying target when there have been accomplished the switching operation, so that transient or built-up phenomena of the regulation system are avoided, otherwise caused by the time-constants of the electronic components and the inertia of the mechanical parts of the regulation system.

The inventive method is advantageously even further improved in that a momentary position of manually actuatable control means determines the relevant value of the azimuth and elevational additional signals, respectively. Further, in a starting position of the control means both additional signals assume the value null, and at the moment of switching such control means becomes ineffectual until it has been brought back into the starting position. In this way there is achieved the result that the first electronic window, after the switching operation, returns to the image center, in order to again re-establish the readiness thereof for renewed switching to another flying target. In this way there can be eliminated as operational errors improperly timed switching operations.

What is advantageous with this switching technique is that by a single manipulation of the operator there is simultaneously detected the second flying object which is henceforth to be measured and the measuring installation is brought into the most favourable electronic and mechanical starting situation for the measurement, whereas the measurement of the first flying target can proceed without any disturbance.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
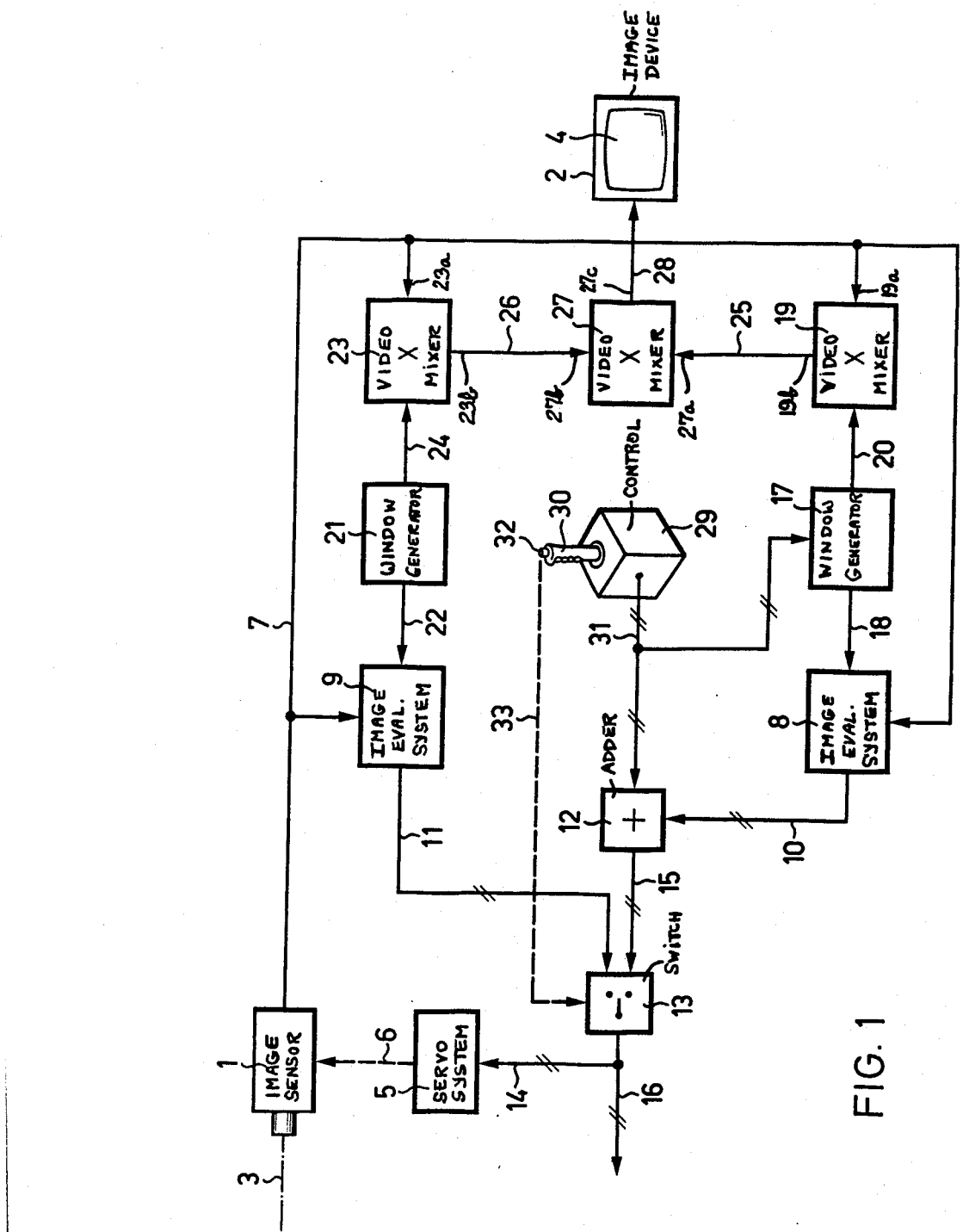
FIG. 1 is a simplified block circuit diagram of a measuring installation for performance of the switching method of the present invention.

Describing now the drawings, there is schematically illustrated in FIG. 1 a target tracking and measuring installation. The observation system of this installation contains an image sensor 1 and an image device 2. The image sensor 1 may be, for instance, a television camera sensitive to light or infrared radiation. Its sighting line or line of sight 3 is illustrated as a dash-dot line. The image device 2 may be, for instance, a conventional television-image device or monitor having an image or monitor screen 4. At the image or monitor screen 4 there appears the trace of the line of sight 3 approximately at the center of the object image. The image sensor 1 is aligned by means of a servo system 5 at a flying target or object to be observed, this having been symbolized by the broken arrow 6. Lag errors of the servo system 5 are here considered to be negligible, i.e., it is assumed that the servo system is capable of following the movements of the flying target.

The signals of the image sensor 1 are infed by means of a line 7 to a first image evaluation system 8 and a second image evaluation system 9. Such image evaluation systems 8 and 9 are well known in this particular field or technology, and thus need not be here further considered in detail. Basically, they analyse the signals of the image sensor 1, corresponding to the image of the flying object or target, in order to determine on the basis of the image contrast the center of gravity or center point of the image surface of the flying target. They then produce a pair of deviation signals which determine the position of the center of gravity in relation to a coordinate system. The reference point of the coordinate system and the direction of the coordinates are chosen such that a respective one of the deviation signals is proportional to the angular measurement of the azimuth deviation of the flying target and the other deviation signal is proportional to the angular measurement of the elevational deviation of the flying target with respect to the line of sight 3. The first image evaluation system 8 infeeds a pair of first deviation signals to a pair of lines or conductors 10, and likewise there is delivered a pair of second deviation signals from the second image evaluation system 9 to a pair of lines of conductors 11. It is here remarked to simplify the illustration all line or conductor pairs have been conveniently shown in FIG. 1 as lines or conductors crossed by two inclined lines.

The first pair of deviation signals is delivered from the line pair 10 by means of an adder or summing device 12 and a switch 13, the function of which will be explained more fully hereinafter, to a conductor or line pair 14. Equally, the second pair of deviation signals is delivered from the line pair 11 by means of the switch 13 to the line pair 14. The signals carried by the pair of lines or conductors 14 are infed as actual value to the servo system 5, for instance, a respective one of the signals serves as the actual value of the direction of the line of sight 3 in azimuth and the other signal as the actual value of the direction of the line of sight 3 in elevation. At the same time these deviation signals are removed from a line pair 16, in order to be employed for recording the momentary direction of the sighting line.

At a first window generator 17 there are produced signals of a first electronic window which control the first image evaluation system 8 by means of the line or conductor 18. Such electronic windows are known, for instance see the aforementioned U.S. Pat. No. 3,736,376 and serve the purpose of improving contrast analysis of the image surface of the flying target. In order to identify the image of the flying target there are only analyzed such image points which are located within the electronic window. The first window generator 17 also controls a first video mixer 19 by means of a line or conductor 20. In a second window generator 21 there are produced signals of a second electronic window, which control the second image evaluation system 9 by means of the line 22. Equally, the second window generator 21 controls a second video mixer 23 by means of a line or conductor 24. The signals of the image sensor 1 are delivered by the line 7 to a respective different input 19a and 23a of both video mixers 19 and 23. The output signals appearing at the outputs 19b and 23b of the video mixers 19 and 23, respectively, are delivered by means of a respective line or conductor 25 and 26 to the inputs 27a and 27b of a third video mixer 27, the output signal appearing at the output 27c controls, by means of a line or conductor 28, the image or television monitor device 2.

In this manner there is produced an image at the image or monitor screen 4 which represents the signals of the image sensor 1 modified by the electronic windows. Such modification resides in the appearance of a respective frame in the target or object image at the image or monitor screen 4, each such frames constituting one of the windows. According to another known and, in fact more conventional construction it would be possible to use a respective crosshair for illustrating the appearance of the respective center of a window, while the frame of the related window does not appear.

Continuing, there are provided control means 29 which can be actuated or manipulated by an operator by means of a two-dimensionally movable control stick or handle 30 or equivalent structure. A given respective direction of movement of the control stick or handle 30 controls, at the control means 29, in known manner the generation of a respective additional or auxiliary signal. One such additional signal is correlated to the azimuth deviation, the other to the elevation deviation. Both additional signals are delivered by means of the line pair 31, on the one hand, to the adder 12 and, on the other hand, to the first window generator 17.

Now in the adder 12 there are summated the mutually correlated deviation and additional signals, from which there is then derived a respective azimuth summation signal and elevation summation signal which are delivered to the switch 13 by means of a respective line of the line pair 15. It is initially assumed that the switch connects the line pair 15 with the line pairs 14 and 16, whereas the line pair 11 is disconnected by such switch. The addition of the auxiliary or additional signals to the deviation signals causes, a change in the actual values infed to the servo system 5 by the line pair 14. The servo system 5 reacts to this change of the actual values by implementing a change in the direction of the line of sight 3, which, however, causes such line of sight 3 to deviate by a reference deviation predetermined by the additional signals, from the direction of the first flying target or object. Since the trace of the line of sight 3 basically appears at the image center at the monitor or image screen 4, the image of the first flying target is shifted from the image center by an amount or value which is determined by the additional signals.

At the same time the azimuth additional signal and the elevation additional signal cause a displacement of the center of the first electronic window at the first window generator 17. If both additional signals are equal to null, then the center of the window is located at the image center at the monitor screen 4. An azimuth additional signal causes a horizontal shifting, an elevation additional signal causes a vertical shifting, and specifically, through exactly the same magnitude as the shifting or displacement of the image of the flying target in response to the same additional signals. In this way the first electronic window, in each displaced position, always frames the image of the first flying target.

On the other hand, the second electronic window always remains centered at the center of the image, since the corresponding second window generator 21 is not controlled by the additional or auxiliary signals. The operator thus can produce by means of the control stick or handle 30 such additional signals which cause a displacement of the image of the first flying target and the first electronic window such that the image of the second flying target comes to lie exactly in the image center and in the second electronic window. This condition has been depicted in FIG. 2.

Figure 2:
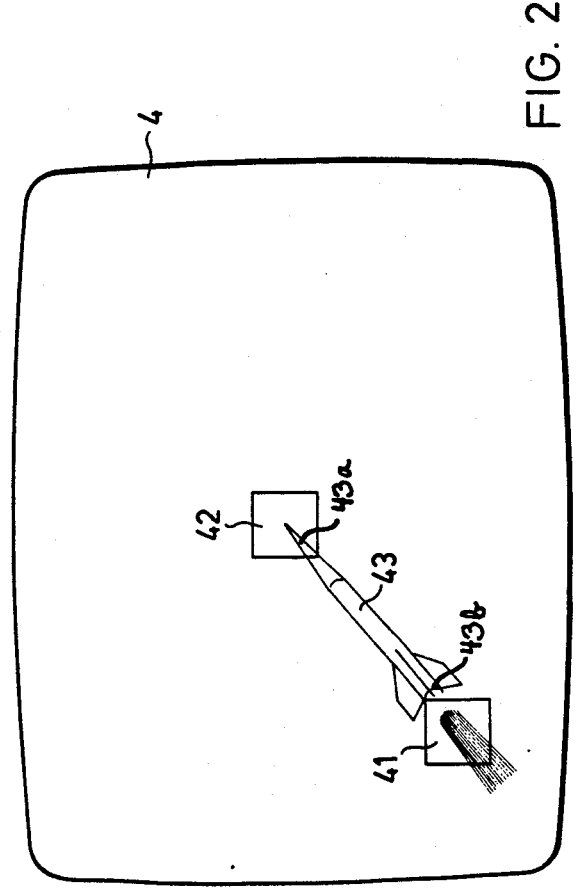
FIG. 2 is a schematic illustration of an object or target image appearing at the image device during the performance of the switching method.

Turning now specifically to FIG. 2 there has been illustrated the object or target image at the image or monitor screen 4. Around the image center there is located the second electronic window, the frame 42 of which is visible. Displaced from the image center there appears the likewise visible frame 41 of the first electronic window. At the monitor or image screen 4 there is visible the object image 43 of a missile or rocket, the cone or tip 43a of which appears in the frame 42, whereas the motor, for instance, the hottest point of the gases emanating from the nozzles 43b, appears in the frame 41. In this case the measurement installation measures the direction of the motor, however, the operator with the aid of the control handle or stick 30 has shifted the image at the image screen 4 such that the tip or cone 43a of the rocket 43 appears at the image center. The line of sight 3, also in this case, is directed at the tip or cone 43a of the rocket 43. Consequently, subsequent switching of the measurement from the motor 43b to the tip or cone 43a of the rocket 43 does not cause any change in the direction of the line of sight 3, any movement of the image center, nor any alteration of the condition of the servo system 5. For switching purposes there is thus not needed any time for finding the new flying object or for build-up or transient response of the servo system 5.

The switching occurs by actuating a switching button or knob 32 which is located on the control handle or stick 30. When pressure is exerted upon the switching knob 32, there is initiated interruption of the connection between the line pairs 15 and 14 and, connection of the line pairs 11 and 14, this having been symbolized by the broken arrow 33. At the same time, due to the pressure which is exerted at the switching knob 32 the additional signals carried by the line pair 31 are biased to the value null and first then again released when the control handle 30 has been brought back into its starting position, for instance, when the additional signals anyway assume the value null.

Upon exerting pressure at the switching knob 32 the servo system 5 receives its actual value from the second deviation signals of the second image evaluation system 9, so that the line of sight 3 now tracks the second flying target. The additional signals return to null, so that the first electronic window returns back to the image center and there is superimposed upon the second electronic window. When the pressure exerted upon the switching knob 32 is released, then the line pairs 15 and 14 are again interconnected, whereas the connection between the line pair 11 and 14 is again interrupted. Since, however, in the meantime the line pair 31 no longer carries any additional signals, the first deviation signals of the first image evaluation system 8 are added in the adder 12 to the value null, for instance, not changed so that there is not impressed any reference deviation upon the servo system 5. The line of sight 3 is and remains aligned at the second flying target, and the measurement installation is in a preparatory mode for repeating the switching method at a further flying target as soon as this is desired.

While there are shown and described present preferred embodiments of the invention, it is to be distinctly understood that the invention is not limited thereto but may be otherwise variously embodied and practiced within the scope of the following claims, Accordingly, What I claim is:

1. A switching method for measuring two neighboring flying targets in succession by means of a measuring installation, comprising the steps of:
   providing a measuring installation having an electronic observation system with image sensor and image device, a regulation system for automatically aligning the image sensor at a flying target to be measured and containing at least one first image evaluation system where there are formed from signals of the observation system a first pair of first deviation signals, one of the deviation signals constituting a measure of the momentary angular deviation in azimuth and the other deviation signal constituting a measure of the momentary angular deviation in elevation between the direction of a first flying target and the line of sight of the image sensor and delivered to the regulation system as an actual value;
   generating at the observation system an electronic window;
   framing the trace of the line of sight by means of the electronic window at the image device;
   limiting the processing of the signals of the observation system in the image evaluation system to such signals which correspond to an image point located at the image device within the electronic window;
   forming in the observation system during the automatic aligning of the image sensor at the first flying target by means of the first image evaluation system a second electronic window;
   positioning the second electronic window at the image device by means of a manually actuatable control means as a frame about the image of a second flying target;
   producing in a second image evaluation system a second pair of second deviation signals;
   said second pair of second deviation signals comprising such signals of the observation system which correspond to an image point located at the image device within the second electronic window;
   one of the second signals constituting a measure for the momentary angular deviation in azimuth and the other of said signals a measure of the momentary angular deviation in elevation between the direction of the second flying target and said line of sight; and
   after positioning the second electronic window at the image of the second flying target switching the actual value of the regulation system from the first pair of deviation signals to the second pair of deviation signals.

2. The method as defined in claim 1, further including the steps of:
   adding a respective azimuth additional signal and elevation additional signal to a respective one of the associated first deviation signals in order to position the second electronic window at the image of the second flying target; and
   simultaneously shifting the image device of the first electronic window through a deviation from the image center corresponding to the azimuth additional signal and the elevation additional signal, respectively, while the second electronic window remains at the image center.

3. The method as defined in claim 2, further including the steps of:
   starting from the value null changing the azimuth additional signal and the elevation additional signal until, owing to the reaction of a servo system of the regulation system to such change, there is approximately annihilated the respective associated second deviation signal.

4. The method as defined in claim 3, further including the steps of:
   selecting the duration of the changing operation to be appreciably greater than the time-constant of the regulation system.

5. The method as defined in claim 2, further including the steps of:
   employing the momentary position of the manually actuatable control means to determine the momentary value of the azimuth additional signal and the elevation additional signal; and
   both additional signals assuming the value null in a starting position of such control means.

6. The method as defined in claim 5, further including the steps of:
   changing the azimuth additional signal and the elevation additional signal starting from the value null, until owing to the reaction of a servo system of the regulation system to such change there is approximately annihilated the respective associated second deviation signal; and
   rendering ineffectual the manual actuatable control means at the moment of switching until it has been brought back into said starting position.

* * * * *